Aug. 2, 1960

C. ORR, JR 2,947,382

CONTINUOUS THERMAL PRECIPITATOR

Filed Feb. 15, 1957

INVENTOR.
CLYDE ORR, JR.
BY
ATTORNEY

Aug. 2, 1960 C. ORR, JR 2,947,382
CONTINUOUS THERMAL PRECIPITATOR
Filed Feb. 15, 1957 2 Sheets-Sheet 2

INVENTOR.
CLYDE ORR, JR.
BY
ATTORNEY

# United States Patent Office 2,947,382
Patented Aug. 2, 1960

2,947,382
CONTINUOUS THERMAL PRECIPITATOR

Clyde Orr, Jr., Atlanta, Ga., assignor to The Georgia Tech Research Institute, Atlanta, Ga., a corporation of Georgia Filed Feb. 15, 1957, Ser. No. 640,549

20 Claims. (Cl. 183—32)

This invention relates to continuous thermal precipitators and is concerned with the continuous fluid sampling by separation of foreign particulate matter from gases. This application is a companion application to the application of Roy A. Martin, Serial No. 557,566, now Patent No. 2,839,155, filed January 5, 1956, entitled "Thermal Precipitator" and partakes of the objects, features and advantages with respect thereto set forth in said application.

In the apparatus of the aforementioned Roy A. Martin application, the phenomena of thermal precipitation is employed by the use of closely spaced heated and cooled surfaces, the gas from which aerosol particulate matter is to be extracted being passed centrally between the plates to discharge radially outward therefrom, the extracted matter being deposited on a collecting member disposed on the surface of the cooled plate. While the structure and operation of the apparatus of the aforementioned Martin application has been successful and has been accorded commercial success, it has been found desirable to provide means by which a continuous testing of fluid for particulate aerosol material may be carried out. It has also been found desirable to provide an apparatus which may be operable either to continuously deposit separated material on a moving surface or one in which the testing may be limited to the successive deposition of collected material on spaced areas of a periodically stationary member. Applicant has therefore provided a thermal precipitation chamber through which there may be passed in close contact with the cooled surface thereof an elongate receiving medium upon which matter extracted from the passing fluid by thermal precipitation may be continuously collected as the fluid to be sampled is passed through the apparatus. An important feature of the present invention is the provision of a structure whereby the movement of the air to be tested is radially inward over the thermal precipitation surfaces to be passed after subjection to thermal precipitation outwardly from the center of the precipitation chamber. By the free admission of such gases radially inward in all directions from a quiescent and turbulence-free outer zone, maximum separation efficiency may be achieved and a uniform distribution of the extracted material may thus be deposited upon the receiving member. Another important feature of the present invention is the fact that the receiving member may be periodically stationary so as to carry out a simple series of successive sampling operations in the manner of the Martin device but where each successive sampling is received on successive areas of a single receiving member.

It will thus be seen that it is among the objects of the present invention to provide a novel and improved thermal precipitator by which a continuous separation of material may be achieved.

It is a further object of the present invention to provide a thermal separator of the character defined in which the extracted material may be continuously deposited on a receiving strip for inspection, analysis and comparison.

It is also an object of the present invention to provide an apparatus of the character defined which may be selectively used for the continuous separation and collection of thermally deposited material, or which may be readily used to provide for the successive depositions of separated material on a stationary receiving surface.

A further feature of the invention is the provision of a curvature of the separation chamber in the direction of receiving material travel whereby a smooth path of travel with the member closely fitting the cold surface is insured.

As a corollary to the above objectives, it is a further object of the present invention to provide for the series deposition of separated material on spaced areas of a continuous strip of receiving material.

The objects of the present invention also include that of providing a means for the thermal separation of material by the free inflow of gases to be tested from a surrounding quiescent and turbulence-free zone in order to achieve maximum uniform deposition of extracted material on a receiving surface.

These and other objects, features and advantages of the present invention will be apparent from consideration of the following specification taken in conjunction with the accompanying drawings, in which.

Figure 1:
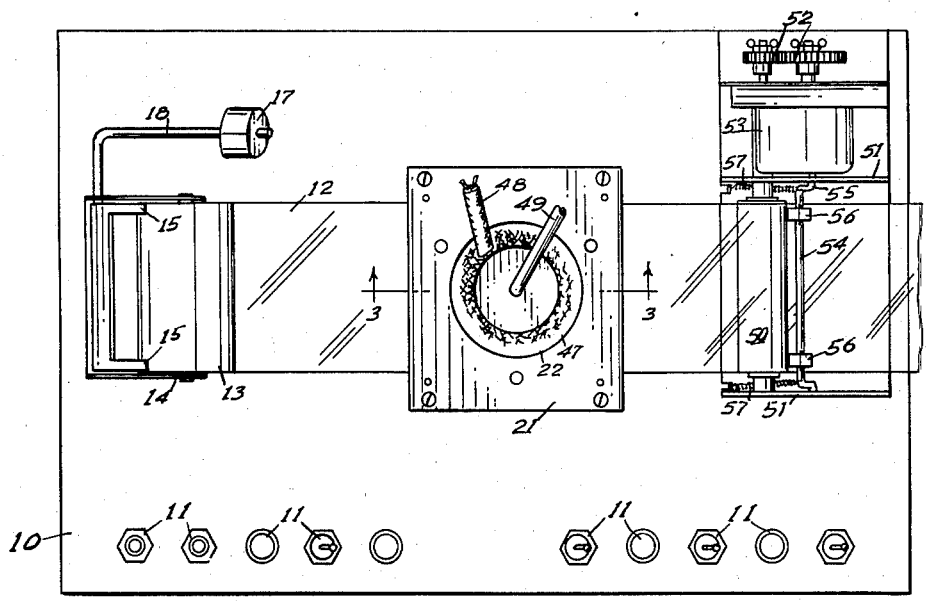
Fig. 1 is a top plan view of one preferred embodiment of the present invention.
Figure 2:
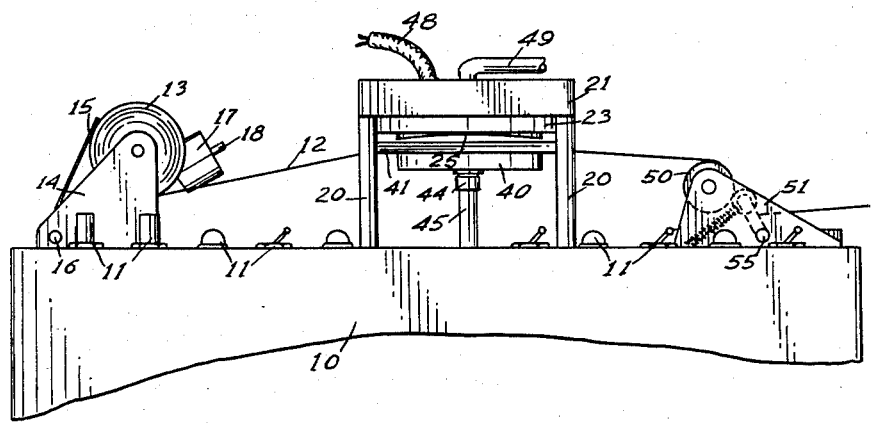
Fig. 2 is a side elevation of that form of the invention presented in Fig. 1.
Figures 3, 4:
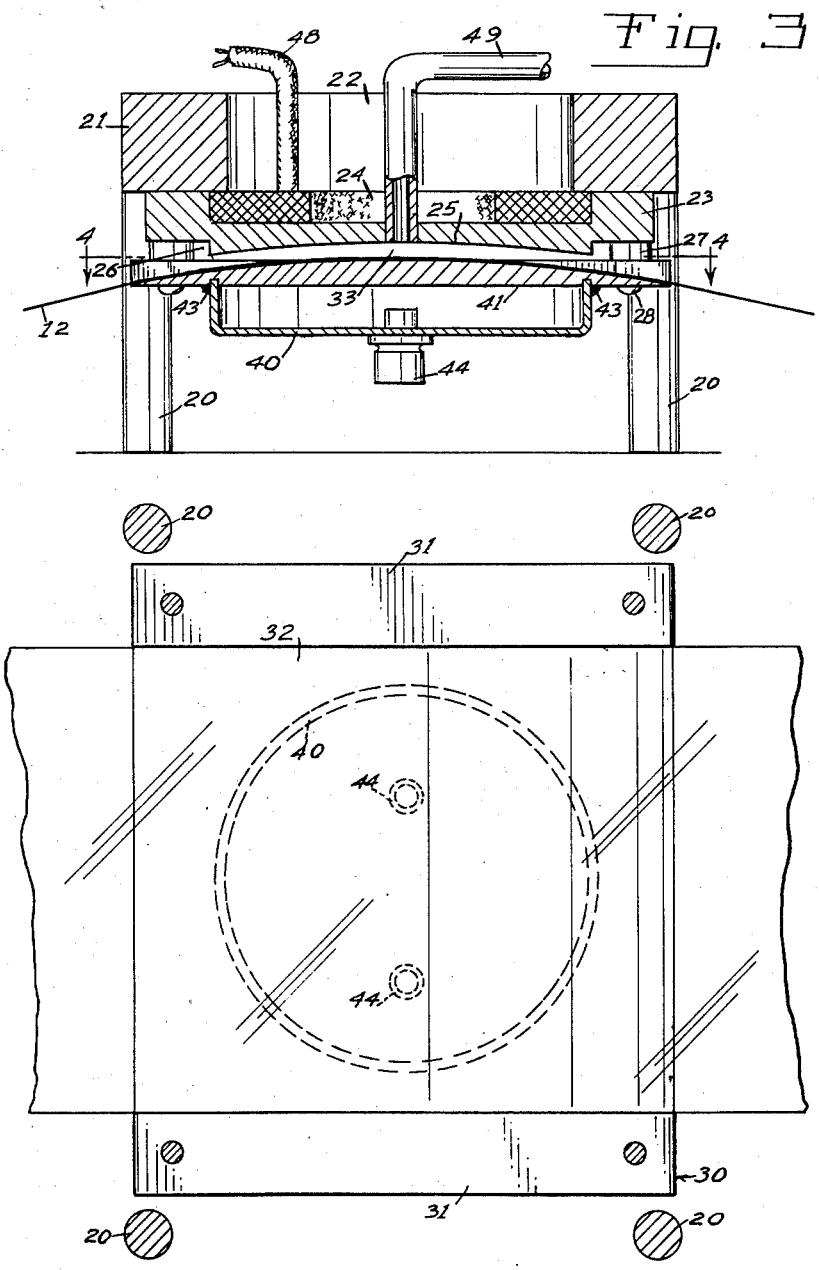
Fig. 3 is an enlarged vertical cross-section of the separation chamber of the present invention as indicated by the line 3—3 in Fig. 1.
Fig. 4 is a horizontal cross-section taken on the line 4—4 of Fig. 3.

Referring now to the drawings which present one structural embodiment of the present inventive concept, there is illustrated a base structure 10 which may preferably represent the horizontal surface of a portable cabinet housing such associate instrumentalities as pumps, pressure gauges, motors and the like, together with their control mechanism, the structure and arrangement of which form no part of the present invention. However, it will be understood that such a cabinet is contemplated, and such a cabinet preferably provides a portable, complete assembly conveniently arranged for ease in transportation and field use. As here indicated by the numerals 11 suitable switches, controls, indicators and coolant fluid inlet and outlet fixtures may be arranged at the forward edge of the horizontal base 10 in position for manipulation by the operator.

In the present form of the invention, the extracted material sampled by the separation chamber is deposited upon a continuous receiving web, here shown in the form of a strip 12 of uniform width and such length as may be required. While the invention is not limited nor confined to the particular material of the receiving strip, it is here shown as, and suggested as being of, transparent material in the nature of "Cellophane" which provides a surface characteristic adequate to receive and retain material deposited thereon in its continuous passage through the separation chamber and/or to receive such material at spaced intervals should the operation of the device be carried out by successive step-by-step operations. Since the material here suggested is transparent, it will facilitate the inspection, analysis and study of the material deposited. However, it will be understood that materials of other surface textures and of opaque material may be employed if desired.

The web of receiving material is here shown as being adapted to be supplied to the separation chamber from a supply roll 13 mounted between brackets 14, a pivoted tension mechanism including spaced roll engaging fingers 15 being provided. The fingers constitute upstanding arms for the tension of the material of the roll 13, a tension weight 17 is mounted on an inwardly extending arm 18 to pivotally urge the fingers toward roll engagement. It will be understood that this arrangement provides a yieldable tension on the surface of the roll so that in the passage of the web of receiving material 12 through the collection chamber a smooth uniform movement of the material is assured.

The collection chamber of the present apparatus is here shown as supported in vertically spaced relation above the surface of the base 10 upon four spaced corner posts 20, the upper ends of which mount a generally rectangular head spacer 21 formed with a central circular opening 22. Mounted from the head spacer 21 and depending therefrom adjacent the periphery of the circular opening 22 there is provided an upper head plate 23 formed with a top circular recess 24 and a lower surface 25. The surface 25 is preferably curved upwardly in concave fashion to conform with the lower surface as hereinafter referred to. The lower edge of the plate 23 is formed with a recess 26 which receives thereagainst cylindrical spacer elements 27 surrounding vertical retention bolts indicated at 28, which bolts pass through the rectangular flange 30 of a lower head plate, hereinafter described, the cylindrical spacer 27, the outer rim of the upper head plate and into the head spacer 21 to secure the thermal separation unit in assembled relation.

The lower or cold head plate assembly includes the rectangular peripheral flange 30 referred to above together with side rails 31 of uniform height and upon which the lower faces of the cylindrical spacers 27 rest. Intermediate the side rails 31, the upper surface of the lower head plate is formed with a convex curvature in the plane of the direction of travel of the receiving web 12. This curved surface 32 between the side rails 31 conforms with the curved surface 25 of the lower face of the upper head to provide a uniform spacing between the surface and thus defining an arcuate chamber 33 characterized by curvature in the direction of travel of the receiving web with uniform straight horizontal upper and lower surfaces transverse with respect to the direction of travel of the receiving web 12. By the provision of this curvature the web moving over the surface under tension will be insured a smooth wrinkle-free passage at uniform progress.

In the present arrangement, the lower head plate 30 constitutes the cold surface of the thermal separation chamber 33. In order to maintain the surface 32 at desired low temperature, there is mounted on the under face thereof a circular dish shaped chamber forming element 40 which may be recessed into the flat under surface 41 of the lower cold head plate 30 as at 42 and may be sealed as by soldering indicated at 43. Coolant fluid may be supplied to and exhausted from the chamber thus formed by nipples 44 to which may be secured suitable flexible supply and exhaust tubing 45. In the operation of the device, it is contemplated that such coolant fluid may be continuously circulated to a cooling chamber to thus maintain an upper surface of the plate 30 at a uniform low degree of temperature.

In this form of the invention, the upper head plate 25 is the hot plate and its lower surface is maintained at a high temperature by an electrical heating coil indicated at 47 which may be conveniently secured between the inwardly extending shoulder formed by the head spacer 21 at the periphery of its central opening 22 and the outwardly extending walls of the recess 24 at the upper surface of the upper head plate 23. Suitable energizing electrical conductors for the heating elements 47 are indicated at 48, being extended upwardly through the central opening of the head spacer from which they may extend to any suitable control mechanism as desired.

An opening is formed at the center of the longitudinal curvature of the under surface of the upper head plate 23 through which is secured a cleaned fluid discharge tube 49 from which the fluid is drawn after subjection to the thermal separation in the chamber 33 between the upper and lower surfaces of the lower and upper head plates 23 and 30, respectively.

The receiving web 12 passes from its roll 13 under the tension of the arms 15 to be trained between side rails 31 of the lower head plate to pass in arcuate fashion in direct contact with the longitudinally arcuate surface thereof and is adapted to be moved therefrom by the rotation of a receiving roll 50 mounted between side brackets 51. In operation, the roll 50 is adapted to be rotated from variable reduction gears 52 rotated from the motor 53. It will be understood that by changing the rate of rotation, the speed of rotation of the roll 50 may be varied while the speed of rotation of the motor 52 remains constant. For tensioning the material of the web 12 as it is received upon the roll 50, there is provided transverse shaft 54 suitably mounted as at 55 and bearing longitudinal rolls 56 which are caused to bear against the edges by virtue of the tension spring 57. It will be noted that the spacing of the tension rolls 56 is such as to engage the side edges of the receiving web exteriorly on each side of the area of the web which passes through the separation zone of the separation chamber, and hence a slow uniform rolling of the receiving tape may be accomplished without contact of the tension elements with any material that is deposited on the web through the thermal separation in the chamber 33.

From the foregoing, it will be seen that in the operation of the device with suction applied to the tube 49, the heating element 47 energized and the coolant material circulated below the lower cold plate 30, the fluid can be sampled and aerosol particles can be extracted by the phenomena of thermal separation from the fluid freely admitted from all sides of the quiescent and non-turbulent gaseous medium surrounding the separation chamber. Thus, such gaseous medium will flow uniformly inwardly in a radial direction through the chamber 33 wherein it is subjected to the contrasting hot and cold surfaces of the head plates 23 and 30, whereby the entrained foreign matter within such fluid is repelled by the hot plate surface 23 to be deposited upon a web 12 passing over and in direct contact with the upper cold surface of the lower plate 30. In such operation with the motor 53 energized it will be seen that the receiving web will continuously receive depositions of the continuously extracted foreign matter from the gaseous medium in the separation chamber. However, it will be understood that the motor 53 may be periodically energized to supply a clean area of the receiving web periodically in the separation chamber; and thus, if desired, the separation operation may be periodic to deposit separate spaced samples of separated material on the receiving web 12. It will be noted more particularly from Fig. 2 of the drawings that the point of departure of the web 12 from its roll 13, and the point of reception of the web on its receiving roll 50 are both below the plane of the edges of the lower head plate, thus the web will be drawn over an arcuate surface of the lower plate in constant and uniform contact therewith, the tensioning elements 15 and 56 will insure the maintenance of a smooth and uniform tension and uniform smooth passage of the web in its travel through the separation chamber. From the foregoing, it will be seen that the present invention provides for the deposition of separated material in a thermal separation zone upon a continuous web of receiving material by which a deposited material may be conveniently studied, analyzed and inspected at leisure.

From the foregoing, it will be seen that while the device provides an ideal means for the continuous separation and deposition of extracted material on a continuously moving web, the device may be operated periodically to provide for separate depositions of extracted material on spaced areas of a receiving web.

It will of course be understood that the structure here presented is by way of example and that in practice of the invention numerous changes, modifications and the full use of equivalents may be resorted to without departure from the spirit or scope thereof as defined in the appended claims.

I claim:

1. A thermal precipitation chamber including an upper plate defining an upper curved surface, a lower plate defining a lower curved surface uniformly spaced from said upper curved surface, means for maintaining said plates at different temperatures, means for passing fluid from which material is to be separated toward the center of the plates between said surfaces and discharge means for conducting said fluid from said center in a direction substantially normal to said surfaces after subjection to thermal precipitation.

2. A thermal precipitation chamber including an upper plate defining an upper curved surface, a lower plate defining a lower curved surface uniformly spaced from said upper curved surface, means for maintaining said plates at different temperatures, and means for passing fluid from which material is to be separated toward the center between said surfaces, together with means movable with respect to said plates for receiving material separated from said fluid.

3. A thermal precipitation chamber including an upper curved surface, a lower plate defining a lower curved surface uniformly spaced from said upper curved surface, means for maintaining said plates at different temperatures, and means for passing fluid from which material is to be separated between said surfaces, together with means for receiving material separated from said fluid, said last mentioned means being disposed for movement with respect to said surfaces and in contact with one of said surfaces.

4. A thermal precipitation chamber including an upper plate defining an upper curved surface, a lower plate defining a lower curved surface uniformly spaced from said upper curved surface, means for maintaining said plates at different temperatures, and means for passing fluid from which material is to be separated between said surfaces, together with means for receiving material separated from said fluid, said last mentioned means being disposed for movement with respect to said surfaces and in contact with one of said surfaces and comprising a continuously movable strip of material.

5. A thermal precipitation chamber including an upper plate defining an upper curved surface, a lower plate defining a lower curved surface uniformly spaced from said upper curved surface, means for maintaining said plates at different temperatures, and means for passing fluid from which material is to be separated between said surfaces, together with means for receiving material separated from said fluid, said last mentioned means being disposed for movement with respect to said surfaces and in contact with one of said surfaces and comprising a continuous strip of material with means for continuously moving said strip over said surface.

6. A thermal precipitator including an upper plate having a curved surface, means for maintaining said upper plate at a predetermined temperature, a lower plate spaced from said upper plate and having a curved surface, conforming with the curvature of the upper plate, means for maintaining said lower plate at a predetermined temperature other than that of the upper plate, means for admitting surrounding fluid medium equally from all sides between said surfaces, and means for withdrawing fluid from the center of the space between said surfaces.

7. The device as set forth in claim 6 in which the curvatures of said surfaces provide a space therebetween of uniform cross-section.

8. The device as set forth in claim 7 in which the curvatures of said surfaces are confined to curvatures in one transverse direction only.

9. A thermal precipitator including an upper plate having a curved surface, means for maintaining said upper plate at a predetermined temperature, a lower plate spaced from said upper plate and having a curved surface, means for maintaining said lower plate at a predetermined temperature other than that of the upper plate, means for admitting surrounding fluid medium equally from all sides between said plates, and means for withdrawing fluid from the center of the space between said surfaces, together with means for passing a material receiving web between said surfaces.

10. A thermal precipitator including an upper plate having a curved surface, means for maintaining said upper plate at a predetermined temperature, a lower plate having a curved surface, means for maintaining said lower plate at a predetermined temperature other than that of the upper plate, means for admitting surrounding fluid medium equally from all sides between said plates, and means for withdrawing fluid from the center of the space formed between said surfaces, together with means for passing a material receiving web between said surfaces and in contact with one of said surfaces.

11. A thermal precipitator including a centrally apertured upper plate having a lower transversely curved surface, a lower plate having an upper curved surface matching and spaced from the curvature of the lower surface of the upper plate, means for admitting fluid between said plates on all sides thereof, means for withdrawing fluid through the central aperture of said upper plate, and means for maintaining said plates at different temperatures.

12. A thermal precipitator including a centrally apertured upper plate having a lower transversely curved surface, a lower plate having an upper curved surface matching and spaced from the curvature of the lower surface of the upper plate, means for admitting fluid between said plates on all sides thereof, means for withdrawing fluid through the central aperture of said upper plate, means for maintaining said plates at different temperatures, and means for receiving material separated from fluid passing between the surfaces of said plates.

13. A thermal precipitator including a centrally apertured upper plate having a lower transversely curved surface, a lower plate having an upper curved surface matching and spaced from the curvature of the lower surface of the upper plate, means for admitting fluid between said plates on all sides thereof, means for withdrawing fluid through the central aperture of said upper plate, means for maintaining said plates at different temperatures, and means for receiving material separated from fluid passing between the surfaces of said plates, said last mentioned means including a continuous web of material receiving tape.

14. A thermal precipitator including a centrally apertured upper plate having a lower transversely curved surface, a lower plate having an upper curved surface matching and spaced from the curvature of the lower surface of the upper plate, means for admitting fluid between said plates on all sides thereof, means for withdrawing fluid through the central aperture of said upper plate, means for maintaining said plates at different temperatures, and means for receiving material separated from fluid passing between the surfaces of said plates, said last mentioned means including a continuous web of material receiving tape together with motor means for periodically moving said tape through the space between the surfaces.

15. A thermal precipitator including a centrally apertured upper plate having a lower transversely curved surface, a lower plate having an upper transversely curved surface matching and spaced from the curvature of the lower surface of the upper plate, means for admitting fluid between said plates on all sides thereof, means for withdrawing fluid through the central aperture of said upper plate, means for maintaining said plates at different temperatures, means for receiving material separated from fluid passing between the surfaces of said plates, said last mentioned means including a continuous web of material receiving tape, and motor means for continuously moving said tape through the space between the surfaces.

16. In a thermal precipitator, a first surface, means for heating said first surface, a second surface spaced from said first surface to define a precipitation chamber therebetween, means for cooling said second surface, and means for producing a flow of gas from which particulate matter is to be separated radially toward a center between said surfaces and through said chamber and thence outwardly from said center through at least one of said surfaces after subjection to thermal precipitation.

17. In a thermal precipitator, a first surface, means for heating said first surface, a second surface spaced from said first surface to define a precipitation chamber therebetween, means for cooling said second surface, and means for producing a flow of gas from which particulate matter is to be separated radially toward a center between said surfaces and through said chamber and thence outwardly from said center through at least one of said surfaces after subjection to thermal precipitation, said last mentioned means including a peripheral spacing of said surfaces to permit peripheral passage of air therebetween.

18. In a thermal precipitator, a first surface, means for heating said first surface, a second surface spaced from said first surface to define a precipitation chamber therebetween, means for cooling said second surface, and means for producing a flow of gas from which particulate matter is to be separated radially toward a center between said surfaces and through said chamber and thence outwardly from said center through at least one of said surfaces after subjection to thermal precipitation, said last mentioned means including a peripheral spacing of said surfaces to permit peripheral passage of air therebetween and a central air passage through one of said surfaces.

19. In a thermal precipitator, a first surface, means for heating said first surface, a second surface spaced from said first surface to define a precipitation chamber therebetween, means for cooling said second surface, and means for producing a flow of air radially toward a center between said surfaces and through said chamber, said last mentioned means including a peripheral spacing of said surfaces to permit peripheral passage of air therebetween and a central air passage through one of said surfaces, and precipitate receiving material disposed over said cooled surface.

20. In a thermal precipitator, a first surface, means for heating said first surface, a second surface spaced from said first surface to define a precipitation chamber therebetween, means for cooling said second surface, and means for producing a flow of air radially toward a center between said surfaces and through said chamber, said means including a peripheral spacing of said surfaces to permit peripheral passage of air therebetween and a central air passage through one of said surfaces, and precipitate receiving material disposed over said cooled surface, and means for continuously moving said material.

References Cited in the file of this patent

UNITED STATES PATENTS

| | | |
|---|---|---|
| 2,701,467 | Strong et al. | Feb. 8, 1955 |
| 2,722,998 | Hall | Nov. 8, 1955 |
| 2,839,155 | Martin | June 17, 1958 |

FOREIGN PATENTS

| | | |
|---|---|---|
| 468,084 | Great Britain | June 29, 1937 |
| 562,394 | Great Britain | June 29, 1944 |
| 808,792 | Germany | July 19, 1951 |
| 906,155 | Germany | Mar. 11, 1954 |